Patented Oct. 22, 1946

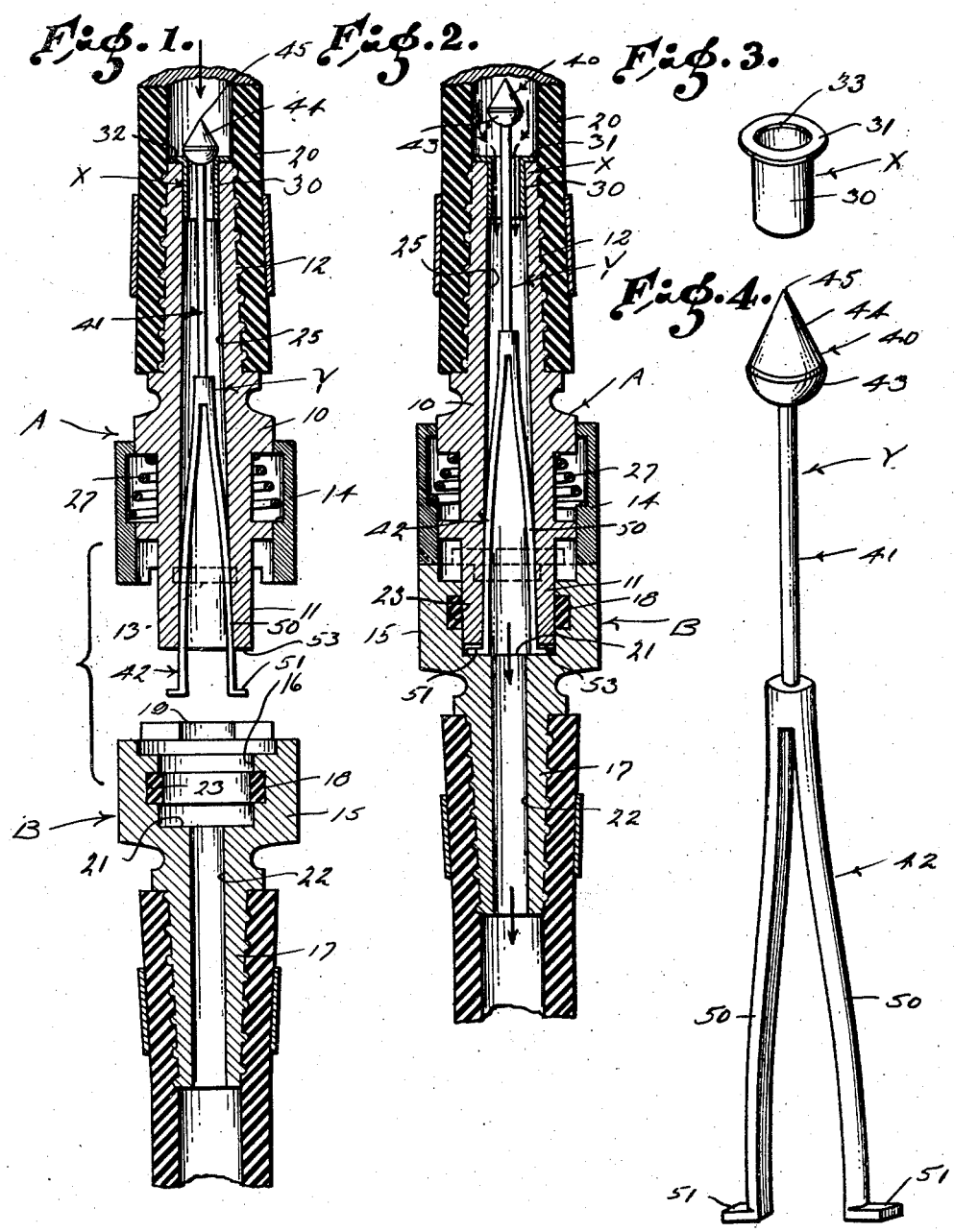

2,409,753

UNITED STATES PATENT OFFICE 2,409,753

VALVE FOR HOSE COUPLINGS

John H. Harrison, Palos Verdes Estates, and Harold E. Byers, Los Angeles, Calif.

Application April 26, 1944, Serial No. 532,762

4 Claims. (Cl. 284—19)

This invention has to do with a valve for hose couplings, or the like, and it is a general object of the invention to provide a simple, practical and effective valve mechanism applicable to hose couplings, or the like, so it is operable to prevent escape of fluid from the hose when the coupling is released or disengaged.

This application is filed as a continuation in part of our copending application Serial No. 516,162, filed December 30, 1943, entitled "Automatic shut-off valve."

Hoses are used extensively for handling fluids. For example, hoses are in common use in various factories and establishments to handle air which is used for various purposes. It is common in such situations or in connection with such systems to employ various lengths of hose which are joined by quick acting couplings. Certain difficulties attend such uses or installations, for instance, when a coupling is released air escapes from the outer end until the coupling is re-established, or until the supply of air is shut off at the source. In some instances the air is shut off at the source before the coupling is released but even in such case the air in the hose escapes. The escape of air from a hose is not only wasteful but it is noisy and may be dangerous due to whipping of the hose and due to blowing foreign matter or dust into the air.

Constructions have been proposed for incorporation in hose couplings to check the escape of fluid therefrom. However, such devices are generally complicated and expensive of construction and generally require work on or special construction of the coupling parts themselves.

It is a general object of our present invention to provide a valve applicable to a typical or standard type of hose coupling to operate as a check valve preventing the escape of fluid from the supply end of the coupling when the coupling is disengaged. The device of the present invention is in the nature of an attachment that can be applied to a standard or common form of coupling without the use of special tools or equipment.

Another object of our present invention is to provide a valve of the character mentioned which is extremely simple and inexpensive of manufacture. The structure of the present invention involves two cooperating or relatively moving parts, one in the form of a simple seat and the other a valve member which is simple in form and inexpensive of construction.

Another object of our present invention is to provide a valve of the general character referred to which, when applied to a standard or typical form of coupling, acts automatically so that it is opened and held open while the coupling is engaged and in active use, and which closes and remains closed while the coupling is released or disengaged. A feature of the device that we have provided is that it requires no special manipulation or actuation but operates automatically in the course of the usual handling of the coupling.

Another object of our invention is to provide a device of the general character referred to which can be readily applied to or assembled with a section of a standard form of coupling to become attached thereto so that it will not be lost or disengaged in the normal course of use. The device of the present invention when applied to a section of a coupling is fast so that it will not be lost either in the hose attached to the coupling or will not become detached from the coupling.

The various objects and features of our invention will be fully understood from the following detailed description of a typical preferred form and application of the invention, throughout which description reference is made to the accompanying drawing, in which:

Fig. 1 is a view illustrating the device of the present invention applied to a typical or standard form of quick acting coupling, the sections of the coupling being shown separated and each section being shown applied to the end of a length of hose. Fig. 2 is a view similar to Fig. 1 showing the coupling sections joined or assembled together, in which case the valve mechanism of the present invention is open, allowing free normal flow from one hose to the other. Fig. 3 is a perspective view of the valve seat of the present invention showing it alone and Fig. 4 is a perspective view of the valve element of the present invention showing it alone.

The device of the present invention is essentially or primarily a valve device in the nature of an attachment applicable to a typical or common form of hose connection. The principles of the invention may be varied to make the construction applicable to hose couplings or fluid couplings of various constructions or types. However, since the invention is most useful and practical as applied to the standard form of quick acting coupling commonly found on air hoses and the like we have chosen to describe it as applied to such a coupling. It is to be understood that the present invention is in no way concerned with the specific details of the coupling to which it may be applied, except as will be hereinafter indicated and, therefore, reference to the particular coupling is to be construed as being primarily for purpose of example.

The coupling shown in Figs. 1 and 2 of the drawing is of a quick acting type in general or common use, and involves, generally, a male section A, and a female section B. The male section A involves a body 10, a tubular projection 11 at the outer end of the body, a hose fitting 12 on the inner end of the body, coupling parts 13 on the projection 11 and a lock collar 14 carried on the body 10 and overhanging the portion of the projection 11 which is provided with the parts 13.

The female section B has a body part 15 with a socket 16 formed in it from its outer end, a hose fitting 17 projecting from its inner end, packing means 18 carried in the body at the socket and coupling parts 19 at the mouth portion of the socket to cooperate with the parts 13 of the male section.

The hose fittings 12 and 17 are tubular parts adapted to be inserted into the ends of hose sections 20 and the exteriors of these fittings are shaped and formed to effectively hold the hose. In practice suitable clamps may be used for securing the hose on the fittings and suitable sealing compounds may be used to assure a tight connection between the fittings and the hose.

The socket 16 extending into the body 15 of the female section is in the form of an enlarged opening or bore having straight side walls. The socket terminates in an outwardly facing shoulder 21 which is formed because of the fact that the opening 22 through the fitting portion of the female section is considerably smaller in diameter than the socket 16.

The sealing means 18 is carried in the socket and is in the form of a ring or washer carried in a recess 23 provided in the wall of the socket intermediate its ends.

The projection 11 of the male section is a turned part which slidably fits into the socket 16 so that when the coupling sections are joined as shown in Fig. 2 it approaches the shoulder 21 and is surrounded by the packing 18.

A longitudinal opening 25 extends continuously through the male section A from the outer end of the fitting 12 to the outer end of the projection 11. The opening 25 registers with the opening 22 forming a fluid passage through the coupling.

The coupling parts 13 and 19 are such as to be interlocked so that they hold the coupling sections together. In accordance with the construction common in devices of the character being described the coupling parts are moved past each other while the sections are in one rotative position and then are engaged by rotating the sections relative to each other. The lock collar 14 serves to hold the couplings against relative rotation from the position where the parts 13 and 14 are in cooperative engagement. The collar 14 is slidable on the body 10 of the male section A and is notched to cooperate with the coupling part 19 on the inner end of the female body 15. A spring 27 normally urges the lock collar toward the female section to maintain it in cooperative engagement with the coupling part 19. To release the two sections A and B from the locked position shown in Fig. 2 the lock collar 14 is withdrawn against the resistance of the spring 27 allowing the sections to be rotated relative to each other to disengage the parts 13 and 19.

The device of the present invention is in the nature of an attachment applicable to the construction above described. In fact, parts provided by our invention are attached to but one section of the coupling, namely the male section. However, the device has cooperative engagement with the female section as will be described.

The device that we have provided involves, generally, a valve seat X and a valve member Y. The valve member of the present invention cooperates with the outer end of the hose fitting 12 and the valve member X serves as a stationary seat at that point to receive and cooperate with the valve. The seat might be machined directly in the projecting end of the fitting 12. However, that would require a machine operation on the coupling construction itself which we prefer to avoid.

The seat X which we have provided involves a tubular body 30 designed to fit into the opening 25 at the projecting end of the hose fitting 12 and a radial flange 31 on the outer end of the body 30 to overlie or engage against the end 32 of the hose fitting 12. A seat 33 is formed in the part X at what may be termed the outer end of the body 30 or at the point where the flange 31 and body 32 join, as will be apparent in Fig. 3 of the drawing. The exact form or shape of the seat will, in practice, depend upon the particular form of valve employed. Where the valve proper is a spherically shaped part the seat 33 is correspondingly formed.

The seat part X above described is adapted to be applied to the inner end of the fitting 12 so that it becomes a stationary or fixed part. The body 30 may be made to fit tightly into the opening 25 so that it is retained by friction. However, since the opening 25 is in most cases unfinished we prefer to employ an adhesive between the body 30 and the wall of the opening 25 sealing the body in the opening and making it secure against displacement.

Since the body 30 of the seat part X fits into the opening 25 it necessarily restricts or cuts down that opening to some extent and, therefore, we prefer to form the body 30 with a very thin wall so that the restriction to flow is minimized. In practice by making the body 30 fairly short so that it restricts the opening 25 at one point only it causes a change in velocity at that point and actually has little, if any, effect on the capacity of the coupling.

The valve part Y provided by our invention involves a head 40, a stem 41 carrying the head and an extension 42 on the stem which serves as a retainer and actuator for the valve.

The head 40 of the valve is designed to cooperate with the seat member X and in the preferred form of the invention has its working or sealing side 43 spherically curved on a radius corresponding to that on which the seat 33 is curved. In the preferred form of the invention the top or upper side 44 of the valve head 40 is extended upwardly to be conical in form and so that it terminates at an apex or point 45. By thus forming the valve head, flow in the direction indicated by the arrows in Fig. 2 is effectively and efficiently divided by the conical part 44 so that the fluid passes around the head of the valve with a minimum of resistance and, further, with the valve head formed with the conical part 44 we find that the valve can be lifted from the closed position shown in Fig. 1 to the open position shown in Fig. 2 with a minimum of force and with considerably less force than is required if the valve head is made flat, as is ordinarily the case with the usual poppet type valve.

The stem 41 is an elongate rod-like part which carries the valve head 40 at one end and the extension 42 at the other end. The stem is preferably round in cross section and is made as small as is consistent with the required strength and rigidity. Further, the stem 41 may be varied considerably in length and in any particular case its length will depend upon the over-all length of the coupling section in which it operates, and with the length required in the extension 42 to gain the desired action as will be hereinafter described.

The extension 42 continues from what may be termed the inner end of the stem 41 and in its preferred form involves a pair of legs 50 which diverge as they extend downwardly or from the stem 41 so that their outer end portions bear against the wall of the opening 25 in the projection 11 of the coupling section A. The extension 42 is formed of a material having sufficient life or resiliency to give the legs 50 an outward pressure sufficient to keep them out against the surface of the wall 25 but not such as to create excessive friction that would materially retard movement of the valve member Y in the coupling section A.

Our invention provides out-turned feet 51 on the outer or projecting ends of the legs 50 which feet occur beyond the outer end 53 of the projection 11. The feet serve to limit the inward movement of the valve member Y in the section A and to cooperate with the shoulder 21 of the female section in causing the valve to open when the sections A and B are moved together. The feet in projecting outward engage or cooperate with the end 53 of the projection 11 to stop inward movement of the valve member Y.

When the coupling sections A and B are separated and the valve member Y is closed as shown in Fig. 1 the legs 50 project a substantial distance beyond the end 53 of the projection 11 so that when the sections A and B are moved together the feet engage the shoulder 21 stopping further movement of the valve member Y. Continued movement of the sections A and B together will result in movement of the section A relative to the valve member Y so that the parts assume a final working position such as is shown in Fig. 2 where the valve head 40 is removed from the seat 33 causing the valve to be open so there is free flow through the coupling.

When the parts are disconnected from the position shown in Fig. 2 and the sections are separated as shown in Fig. 1, flow or pressure outward in the hose connected with the fitting 12 closes the valve head 40 against the seat member X so the surface 43 engages the seat 33 thus checking or preventing discharge of fluid from the male section of the coupling.

To assemble the valve construction of the present invention with a typical coupling such as we have described it is merely necessary to disengage the hose from the fitting part 12 of the male section allowing the valve seat X to be applied as above described, whereupon the valve member Y can be arranged in place by inserting the extension 42 through the seat member X and moving the valve member Y downward until the parts assume a position where the feet 51 are beyond the outer end 53 of the projection 11. As the feet are moved downward through the opening 25 they bear outward so that they spring out into a position to engage the end 53 of the projection 11 as soon as they pass beyond or out of the projection 11.

It will be apparent from an examination of the drawing that when the parts have been arranged or assembled the seat X is permanently in place and the valve part Y, which operates in the opening 25, is attached or coupled to the other parts so that it cannot become dislodged or displaced. To remove the valve it is merely necessary to depress the legs 50 allowing the feet 51 to enter the opening 25, whereupon the valve Y can be moved upwardly and in the course of moving upward it will engage under the inner end of the seat body 30 and upon the application of sufficient pressure it can be employed as a means for disengaging or dislodging the seat. If desired to remove the valve Y without removing the seat X the legs can be depressed or moved together so that the feet 51 pass the inner end of the seat body 30 and thus allow the valve member to be removed without disturbing the seat.

From the foregoing description it will be apparent that we have provided a construction involving simple, inexpensive parts which can be applied to a typical coupling construction quickly and without in any way modifying the coupling parts themselves. Further, it will be apparent that the device requires no special operation or manipulation. As the coupling parts are moved together in the usual manner the valve is automatically open and will stay open so long as the coupling is together. When the coupling sections are separated the valve automatically closes and will remain closed until the coupling is re-applied or until the extension 42 is deliberately operated to open the valve.

Having described only a typical preferred form and application of our invention, we do not wish to be limited or restricted to the specific details herein set forth, but wish to reserve to ourselves any variations or modifications that may appear to those skilled in the art or fall within the scope of the following claims.

Having described our invention, we claim:

1. A valve for use in a hose coupling including, a seat to be mounted in a coupling part, and a valve member including a head to cooperate with the seat and an extension for retaining the member in said coupling part and to be engaged to operate the head relative to the seat, the extension including spaced divergent resilient legs closely coupled together at their inner ends and having their outer ends spaced apart to normally bear outwardly into pressure engagement with the coupling part.

2. A valve for use in a hose coupling including, a seat to be mounted in a coupling part, and a valve member including a head to cooperate with the seat and an extension for retaining the member in said coupling part and to be engaged to operate the head relative to the seat, the extension including spaced legs normally bearing outwardly into engagement with the coupling part, and outwardly disposed projections on the legs at their outer end portions.

3. A valve member of the character described including, a seat to be mounted in a fluid passage, a stem passing through the seat, a valve head on one end of the stem to cooperate with the seat, and an extension on the other end of the stem, the extension including divergent resilient legs which when pressed together are adapted to pass through the said passage.

4. A valve member of the character described including, a stem, a valve head on one end of the stem, and an extension on the other end of the stem, the extension including resilient divergent legs and outwardly projecting feet on the outer ends of the legs.

JOHN H. HARRISON.
HAROLD E. BYERS.